Dec. 24, 1957 N. O. BRANDELL 2,817,444

LIBRARY COMPACT STORAGE SYSTEM

Filed June 25, 1954 4 Sheets-Sheet 1

INVENTOR.
NELS O. BRANDELL
BY
Bean, Brooks, Buckley & Bean,
ATTORNEYS.

INVENTOR.
NELS O. BRANDELL
BY
Bean, Brooks, Buckley & Bean,
ATTORNEYS.

Dec. 24, 1957 N. O. BRANDELL 2,817,444

LIBRARY COMPACT STORAGE SYSTEM

Filed June 25, 1954 4 Sheets-Sheet 3

INVENTOR.
NELS O. BRANDELL
BY
Beau, Brooks, Buckley & Beau,
ATTORNEYS.

INVENTOR.
NELS O. BRANDELL
BY
Beau, Brooks, Buckley & Beau,
ATTORNEYS.

United States Patent Office 2,817,444

Patented Dec. 24, 1957

2,817,444

LIBRARY COMPACT STORAGE SYSTEM

Nels O. Brandell, Jamestown, N. Y., assignor to Art Metal Construction Company, Jamestown, N. Y.

Application June 25, 1954, Serial No. 439,195

3 Claims. (Cl. 211—150)

This invention relates to improvements in library or book storage systems; and more particularly to improvements in so-called compact library storage systems.

A primary object of the invention is to provide an improved multiple case type book storage system by virtue of which a larger number of books may be stored in readily accessible manner in a given storage room plan view area.

More specifically, the invention has for one of its objects the provision of an improved combination arrangement of stationary and swingable book case elements having vertically spaced shelves, so relatively arranged and supported that all of the books stored therewithin are at all times readily accessible for examination and/or withdrawal and replacement.

Another object of the invention is to provide a novel combination of stationary and swinging bookcase units wherein the swinging bookcase components are of novel form and mounted for swinging in novel manner relative to the stationary bookcase components, whereby a larger number of books or the like may be stored therewithin for any given plan view area.

Still another object of the invention is to provide, in a combination stationary bookcase and swinging bookcase unit, a novel type of swinging bookcase whereby reduced loads are imposed upon the swinging bookcase hinge and support devices.

Other objects and advantages of the invention will appear from the specification hereinafter.

Figure 1:
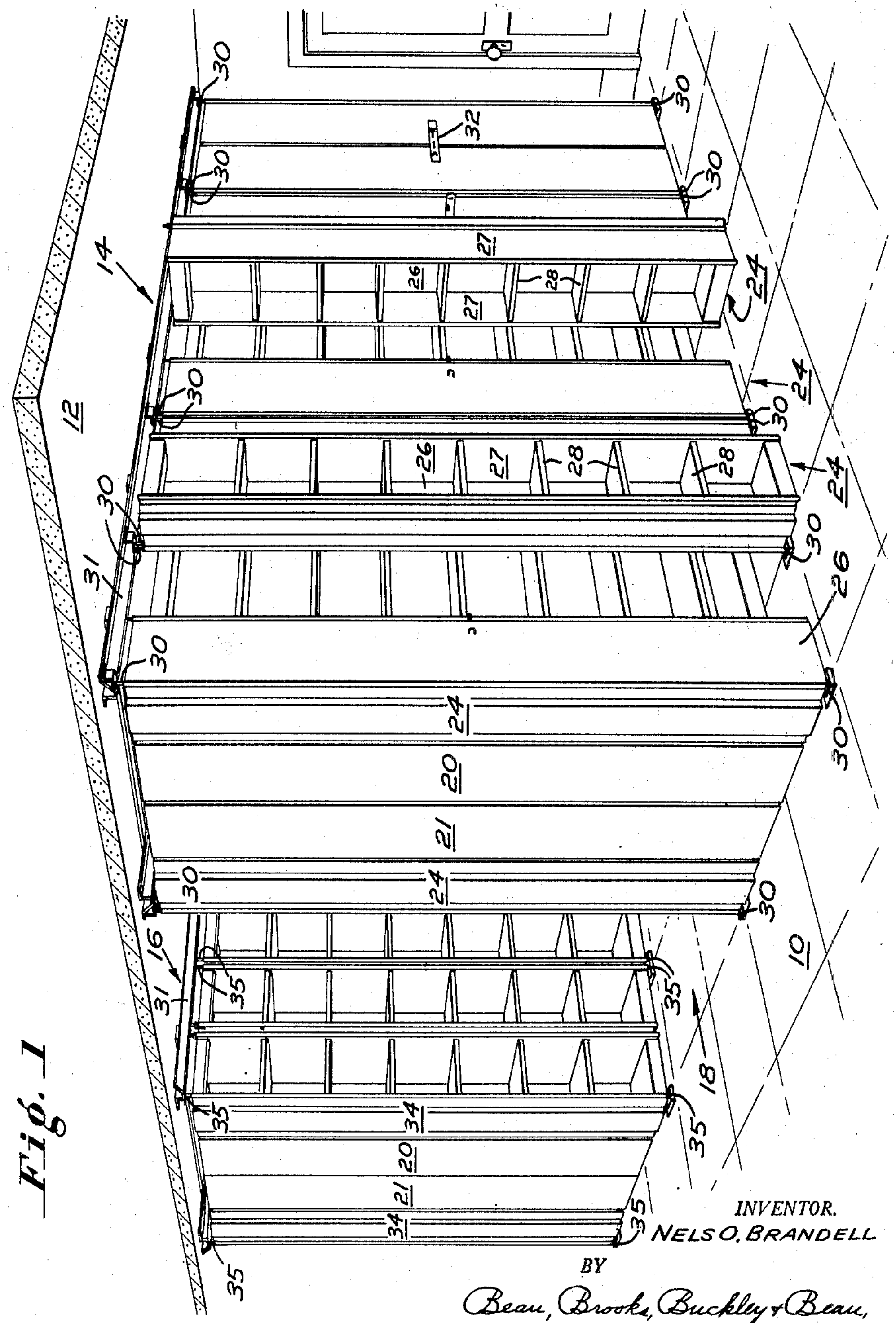
Fig. 1 is a fragmentary perspective view of a library storage stack arrangement of the invention, showing a pair of bookcase stack units having an aisleway therebetween.

Fig. 1 illustrates by way of example a library storage or "stack" system embodying two different structural arrangements of swinging bookcase components in accord with the present invention. Thus, as shown in Fig. 1, the storage room is illustrated to include a floor structure 10 and a ceiling structure 12 between which are disposed two separate units or "stacks" as indicated generally at 14–16; the stacks 14–16 being arranged in spaced parallel relation so as to define therebetween an aisleway as indicated at 18. Sectional and detail views of the constructions of the stack unit 14 are shown at Figs. 2, 5, 6, 7; while sectional and detail views of the stack unit 16 are shown at Figs. 8, 9, 10, 11.

Figures 2, 3, 4, 11, 12:
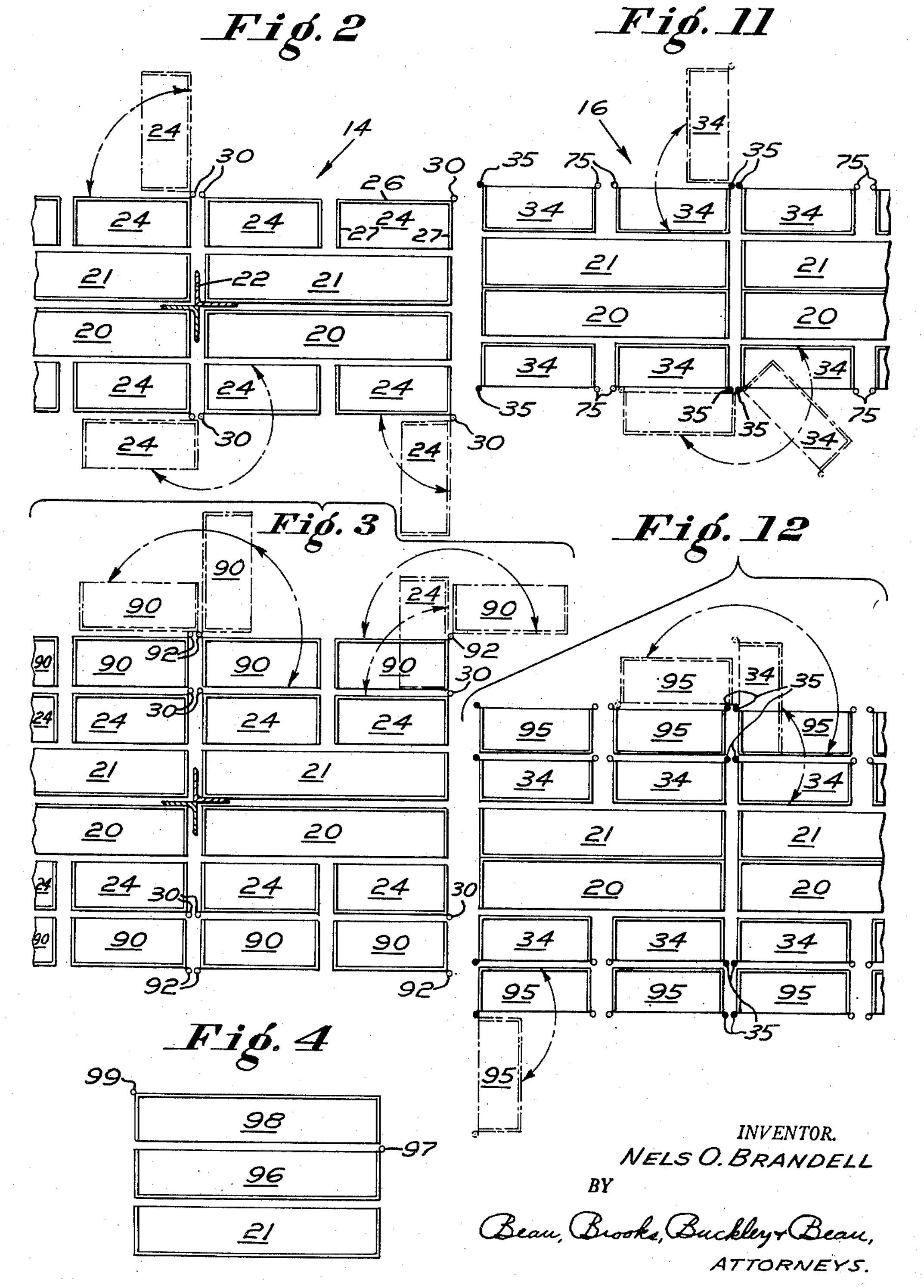
Fig. 2 is a fragmentary diagrammatic top plan view of one of the library stack combination units of Fig. 1.
Fig. 3 is a fragmentary diagrammatic view, similar to Fig. 2, but of another form of stack combination unit of the invention.
Fig. 4 is a fragmentary diagrammatic view similar to Figs. 2–3, but of still another form of the invention.
Fig. 11 is a fragmentary diagrammatic top plan view of another one of the library stack units shown in Fig. 1.
Fig. 12 is a view corresponding to Fig. 11, but illustrating still another arrangement of the invention.

Referring now specifically to the stack unit 14 as shown in Figs. 1, 2, 5, 6, 7, the unit comprises two central rows of stationary bookcase structures, as illustrated at 20—21 respectively; the bookcase members 20—21 being arranged in back-to-back relation throughout the length of the stack unit running parallel to the aisleway 18. As shown in Fig. 2, the storage stack column members may be conveniently accommodated to extend vertically between adjacent stationary bookcase elements 20—21, as indicated, for example, at 22 in Fig. 2. As shown in the drawings at Fig. 2, the stack column 22 is of X-sectioned form and is thereby adapted to nest between adjacent bookcase elements 20—21 in such manner as to conserve floor plan space to maximum advantage. However, any other form of bookcase support may be utilized, as preferred.

As stated hereinabove, the stationary bookcase elements 20—21 are arranged in back-to-back relation with their open fronts facing outwardly in opposite directions from the longitudinal center line of the stack unit. Each bookcase component 20—21 is preferably so designed as to extend from floor to ceiling so as to utilize all available space between those structures for book storage purposes, and may be of any desired depth and width dimensions. However, it is to be noted that in plan view the stationary cases are of "double width" compared to their companion swinging cases, as will now be explained.

In the case of the stack unit 14, a line of swinging bookcase components as designated at 24 is arranged parallel to and directly in front of each row of stationary bookcases 20—21; each swinging bookcase 24 comprising a vertically elongated bookcase structure comprising generally a back plate 26; opposite side plate 27—27; and suitable shelving at vertically spaced intervals therein as indicated at 28. The bookcase components 24 are relatively arranged in pairs, and the outside corner portions of the paired cases are mounted by means of vertical hinge devices as indicated at 30 at their upper and lower ends to the ceiling and floor structures, respectively; or in lieu thereof to suitable supplemental header devices carried by the ceiling and floor structures, as indicated at 31 in Fig. 1. The swinging case members 24 are provided of such width dimensions that they are slightly less than one-half the plan view width of their companion stationary cases, so as to enable them to be swung outwardly upon their hinge axes into the adjacent aisleway spaces of the building, as illustrated by broken line showings in Fig. 2. Thus, the interiorly disposed stationary bookcase members 20—21 are uncovered for ready access to the material stored therein while requiring minimum aisleway space for the swinging cases.

As illustrated in Figs. 1 and 2, the stack unit 14 illustrates one possible arrangement of the invention wherein the swinging case members 24 are disposed so that when they are in nested relation against the stationary bookcase components 20—21 the swinging case components face inwardly thereby exposing their closed back wall portions to the aisleways. This arrangement provides automatic covering of the contents of the book stack when the swinging cases are in closed positions, so that any suitable lock devices such as indicated at 32 may then be arranged to engage across adjacent swinging cases so as to lock them together in closed positions, as an anti-theft measure.

By means of the arrangement as shown in Fig. 2, wherein each of the stationary cases 20—21 is complemented by a pair of swinging case components 24, instead of a single swinging case having a width equal to the width of the stationary case, the required aisleway width is greatly reduced. Thus, the aisleway adjacent each stack unit may be of only such width as to accommodate passage of a person therethrough. Then, when the pair of swinging case units are opened out into the aisleway they will extend thereacross thereby exposing and rendering accessible the double width stationary bookcase; and all of the books in the stationary and swinging case components are thereby readily accessible to a person standing within the "cell" thus defined by the stationary case and the opened swinging cases.

As shown in Figs. 1 and 11, the stack unit 16 is generally similar to the stack unit 14, except that the swinging case components of the stack unit 16, as designated at 34, are arranged to face outwardly when in retracted positions against the corresponding stationary case components 20—21. Thus, the swinging case components 34 of the stack unit 16 are mounted upon vertical hinge devices as indicated at 35 in such manner that when the swinging case components are nested back against the stationary case members, the open fronts of the swinging cases face outwardly, thereby rendering the contents of the swinging cases readily available to the aisleway without first swinging open the cases 34. This arrangement may be preferred in instances where anti-theft measures are believed unnecessary. It will of course be appreciated that in order to gain access to the contents of the stationary case components, the swinging case members are merely pivoted outwardly as to the broken line positions thereof in Fig. 11, thereby rendering accessible the contents of the inner cases.

Figure 5:
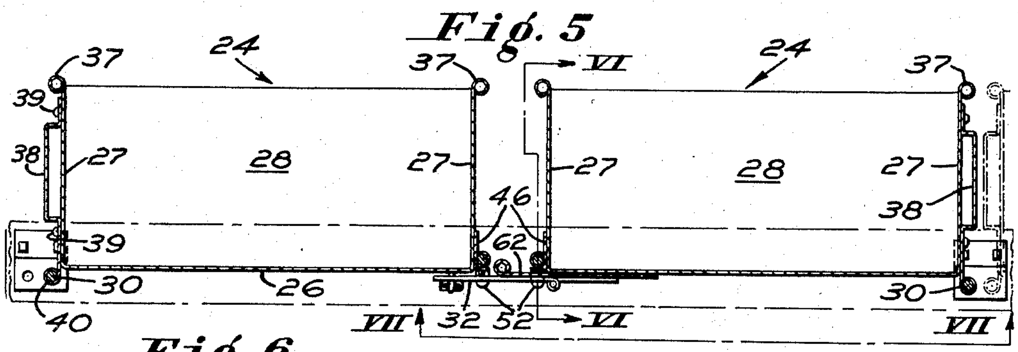
Fig. 5 is a fragmentary horizontal sectional view, on an enlarged scale, taken along line V—V of Fig. VI.
Figure 6:
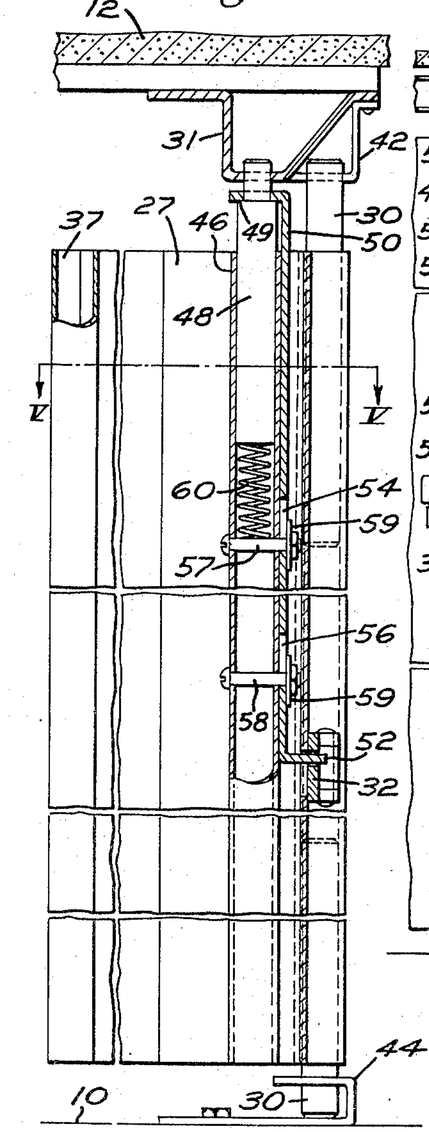
Fig. 6 is a fragmentary vertical sectional view, taken along line VI—VI of Fig. 5.
Figure 7:
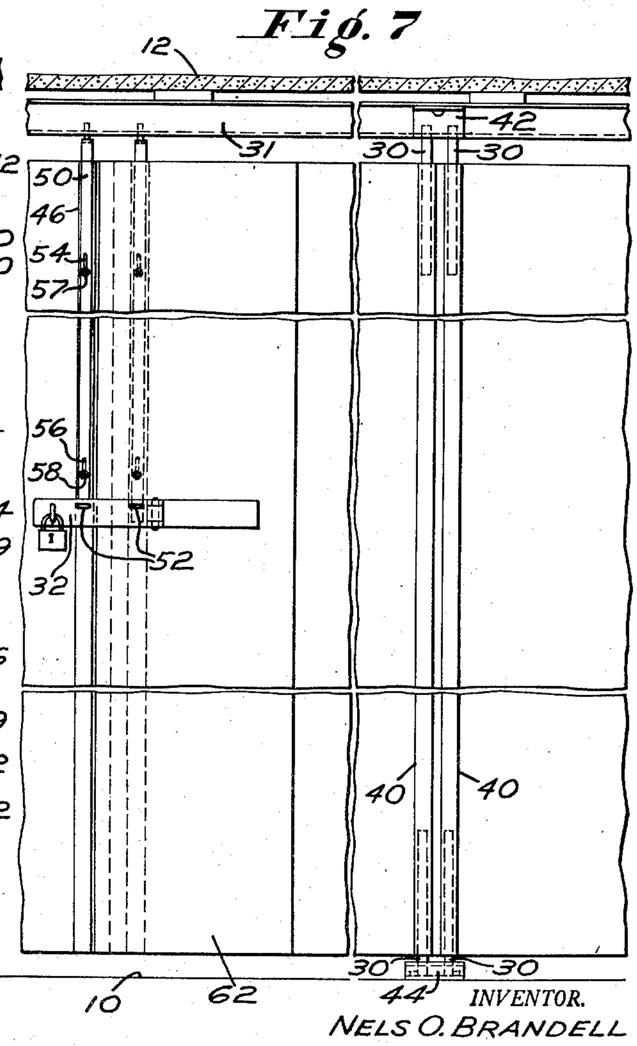
Fig. 7 is a fragmentary front elevational and vertical sectional view taken along line VII—VII of Fig. 5.

Figs. 5, 6, 7 illustrate preferred details of construction of the swinging case components. For example, as shown therein each swinging case member of the stack unit 14 is designated generally at 24 to comprise a back wall plate portion 26 such as may be conveniently formed integral with the opposite side wall portions 27—27 by any suitable sheet metal bending process. The marginal edge portions of the sheet plate may then be conveniently rolled as indicated at 37 to provide edge stiffening means adjacent the open fronts of the case devices. The shelf members 28 may of course be formed in any desired manner from sheet metal or the like and mounted within the cases in any preferred style. Provisions for mounting the vertical hinge pins 30—30 at the opposite upper and lower ends of each case 24 are made by means of hat-sectioned sheet metal brackets 38 which may be riveted to one end wall 27 of each case, as indicated at 39. The brackets 38 terminate in each case at one vertical edge portion in a rolled section 40 dimensioned to enclose upon the corresponding vertical hinge pins 30, whereby the bracket 38 functions simultaneously to stiffen and reinforce the load carrying end portion of the swinging case and to carry the hinge pins 30—30 which slip-fit into socketed brackets 42—44 carried by the ceiling header 31 and the floor structure, respectively.

A mechanism for holding the swinging bookcase components in closed positions (independently of the hasp 32 referred to hereinabove) is illustrated in Figs. 5, 6 and 7. Such device may comprise, in the case of each swinging bookcase, an I-shaped bracket 46 affixed to extend vertically of the front edge of the bracket 46 affixed to extend vertically of the front edge of the swinging front edge portion of each bookcase. A slide bolt 48 telescopically fits within the tube shaped portion of the bracket 46 and is dimensioned to extend at its upper end into slip-fitting engagement with a registering aperture in the top header 31 previously referred to. Just below its upper end, the slide bolt 48 is provided with a shoulder 49 which is engaged by a bent finger portion of a pull plate 50 which extends downwardly in front of the slide bolt 48 and terminates at its lower end in an outwardly bent tab portion 52. The pull bar 50 is vertically slotted as indicated at 54—56 to receive the outer end portions of bolts 57—58 (Figs. 6, 7); the outer end portions of the bolts 57—58 carrying washers 59 overlying the slotted portions 54—56 of the pull bar. Thus, the bolts guide the pull bar while permitting it to be pulled downwardly from the position thereof shown in Fig. 6.

A compression spring 60 is mounted between the bolt 57 and the slide bolt 48 so as to bias the latter upwardly toward the bookcase locking position shown in Fig. 6; but it will be understood that upon manual depression of the tab portion 52 of the pull bar 50, the latter may be pressed downwardly so as to retract the upper end of the slide bolt 48 from locking engagement with the header 31. The hinged hasp plate 32 is conveniently slotted so as to permit the tab portion 52 of the pull bar to slip-fit therethrough when the slide bolt 48 is in locking position and the hasp 32 is closed (Figs. 6–7). Thus, when the hasp 32 is padlocked in closed position, as in any well known manner, the pull bar 50 is thereby locked against retraction of the slide bolt 48.

Hence, to gain access to the stored materials the hasp 32 must first be unlocked by the custodian of the book stack before the swinging bookcase member may be moved around from closed to open position, as explained hereinabove. Then, when it is desired to close the book stack, the swinging bookcase component is simply swung toward closed position upon its hinges 30—30 until such time as the upper end of the slide bolt 48 cams against the front sloping surface portion of the header 31. The slide bolt 48 is thereupon cammed downwardly against the action of the spring 60 so as to permit the bookcase to move into closed position, whereupon the sliding bolt 48 automatically moves upwardly into bookcase locking position. The hasp 32 may then be closed and padlocked, to complete the locking of the book stack. A gap closure plate as indicated at 62 may be spot-welded or otherwise affixed to the front surface of one of each pair of the swinging cases as shown in Figs. 5, 7, so as to substantially close the gap between adjacent swinging bookcase components at the front surfaces thereof, without interfering with swinging movements of the bookcases as explained hereinabove.

Figures 8, 9, 10:
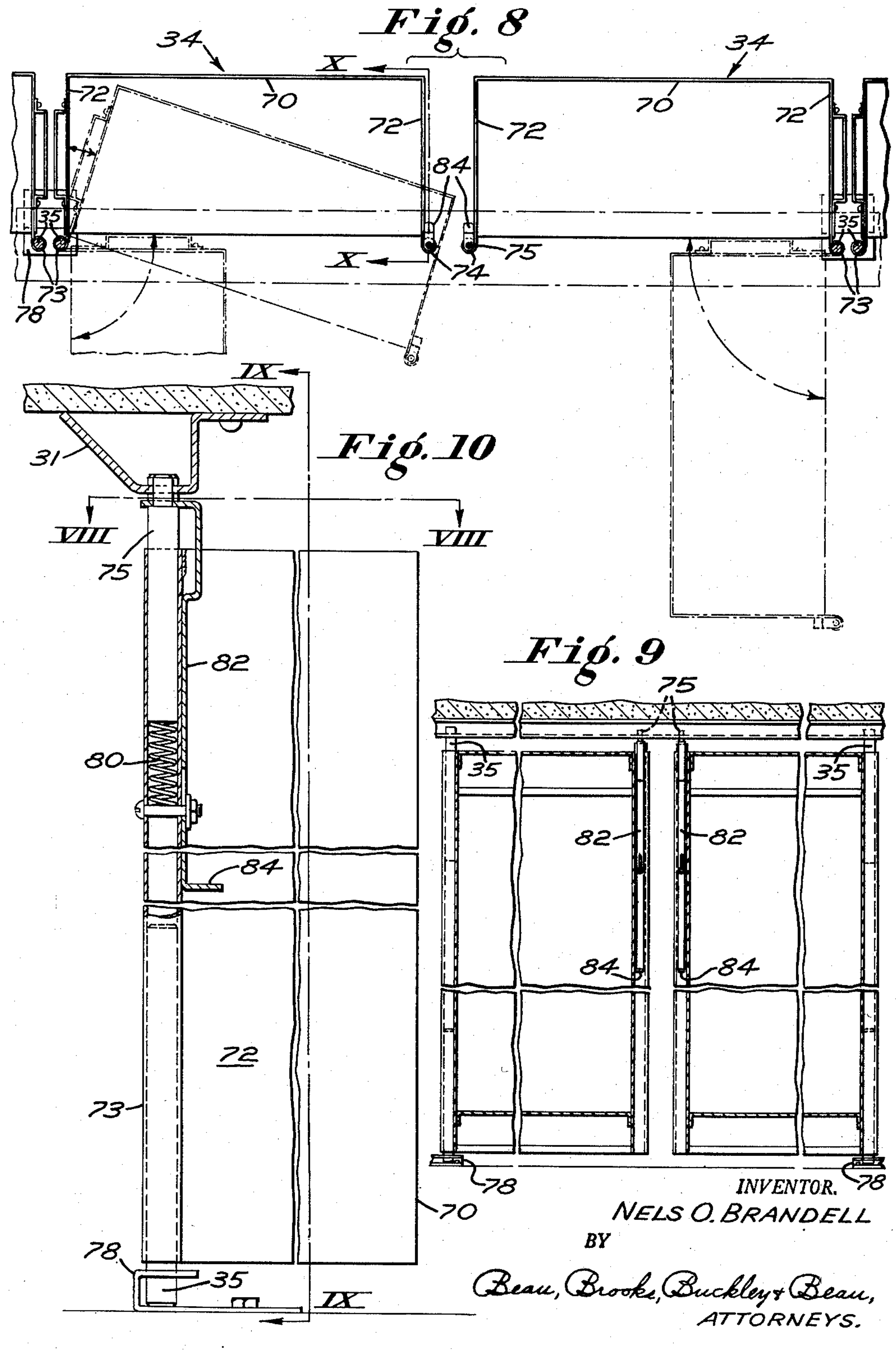
Fig. 8 is a view corresponding to Fig. 5, but taken along lines VIII—VIII of Fig. 10.
Fig. 9 is a view corresponding to Fig. 7, but taken along line IX—IX of Fig. 8.
Fig. 10 is a fragmentary sectional view, taken along line X—X of Fig. 8.

Figs. 8, 9, 10 illustrate preferred details of construction of the swinging case components of the stack unit 16, wherein the swinging case members are disposed with their open front portions normally facing outwardly, as distinguished from the arrangement of the book stack unit 14. Thus, in the case of Figs. 8, 9, 10, each swinging bookcase member is designated generally at 34 to comprise a back wall plate portion 70 conveniently formed integrally with opposite side wall portions 72—72 by any suitable sheet metal bending process. The front marginal edge portions of the side wall members are conveniently rolled as indicated at 73—74 to provide front edge stiffening means, and also to provide convenient mounting arrangements for the bookcase swinging hinge pintles 35 and bookcase locking slide bolts 75, respectively. The hinge pintle rods 35 are conveniently based at their upper ends upon the header 31 previously referred to, and at their lower ends upon floor brackets 78, as in the manner of the hinge mountings of the swinging bookcase components of the unit 14 previously described.

The locking bolts 75 are arranged to be biased upwardly by means of compression springs 80, and a control rod 82 is provided behind each bolt 75 and formed with a laterally extending finger portion 84 at its lower end adapted to be manually manipulated for depressing the locking bolt 75 out of bookcase holding position whenever it is desired to swing the bookcase member outwardly to provide access to the stationary bookcase components therebehind. Thus, in the construction shown in Figs. 8, 9, 10, it is only necessary for the library attendant to reach around behind the front edge portion of the swinging bookcase member and to press downwardly upon the latch pad portion 84, whereby the bookcase will be freed so as to be adapted to swing as to the broken line positions shown in Fig. 8, thereby exposing the contents of the stationary bookcase components therebehind.

Whereas, Fig. 2 illustrates diagrammatically the operative arrangement of the form of book stack unit indicated at 14 in Fig. 1, Fig. 3 illustrates diagrammatically a modified version thereof comprising in combination a line of stationary bookcase components 20—21 fronted by swinging bookcase components 24 (as in the manner of Fig. 2) but with the addition of second rows of swinging bookcase components designated 90 in front of each row of bookcase components 24. The bookcase components 90 are mounted upon vertical hinges as indicated at 92, as in the manner of the mounting of the bookcase components 24 by means of pintles 30. Thus, it will be understood that the bookstack arrangement of Fig. 3 provides approximately one third more book storage capacity per bookcase unit, compared to the arrangement of Fig. 2. The outermost swinging bookcase components 90 are readily movable from their closed (solid line positions as shown in Fig. 3) to the broken line positions thereof swinging through an arc of approximately 180°, thereby permitting the intermediately disposed swinging bookcase components 24 to be swingable outwardly through an arc of approximately 90°, thereby exposing to view the contents of all of the swinging bookcase components as well as the stationary bookcase components, as diagrammed in Fig. 3.

Similarly, Fig. 12 illustrates diagrammatically a modification of the bookstack unit type designated 16 in Figs. 1 and 11, into an increased capacity version thereof, somewhat in the manner illustrated in Fig. 3. Thus, in the case of Fig. 12, the stationary cases 20, 21 and the intermediately disposed rows of swinging bookcases 34 are set up and arranged as in the manner of Fig. 11; but in the case of Fig. 12 additional outer rows of swinging bookcases 95 are provided. Thus, the difference between the arrangement of Fig. 12 and Fig. 3 is that in Fig. 12 all of the bookcase components are arranged to face outwardly as distinguished from the normal closed back arrangement of Fig. 3. As a consequence in the arrangement of Fig. 12, the outer bookcase components 95 are always readily accessible from outside of the book stack unit, while being readily swingable to the broken line positions thereof shown in Fig. 12, whereby to expose the next row of bookcase components 34. These bookcase components 34 are also swingable as to the broken line position thereof shown in Fig. 12 whereby to expose the innermost or stationary bookcase components.

Fig. 4 illustrates still another structural arrangement of bookcase components wherein one of the stationary bookcase components as referred to hereinabove and designated 21 in Fig. 4 is fronted by a swingable bookcase component 96 which is hinged as indicated at 97 and is in turn fronted by another swingable bookcase component 98 which is hinged as indicated at 99. It will be appreciated that whereas Fig. 4 shows only one stationary case element 21 fronted by swingable cases 96—98, the arrangement as illustrated may be readily duplicated as in Figs. 1, 2, 3, 11, 12 by backing up another stationary bookcase member against the member 21 as shown in Fig. 4 and so on, in the manner of the arrangements hereinabove described. Thus, in the case of an arrangement as shown in Fig. 4, the outermost swinging case 98 may be readily hinged upon its connection 99 so as to expose the contents of the intermediately positioned bookcase 96; and this latter case may similarly be swung upon its pivot connection 97 so as to expose the contents of the stationary case 21.

In the bookstack arrangements of the invention as illustrated and described the swinging bookcase components are constructed and arranged so as to be adapted to nest compactly against the stationary bookcase components and against one another when in storage-closed positions; while the movable case components are at all times selectively swingable to open positions as explained hereinabove in accord with a novel technique requiring minimum "swing-about" space exteriorly of the closed-storage plan forms of the stacks; thereby requiring minimum plan view area for maximum storage capacity purposes.

Although only a few forms of the invention have been shown and described in detail, it will be apparent to those skilled in the art that the invention is not so limited but that various changes may be made therein without departing from the spirit of the invention or the scope of the appended claims.

What is claimed is:

1. A library storage structure comprising parallel storage units relatively spaced to define an aisleway therebetween, at least one of said units comprising in combination an inner row of stationary bookcases, an intermediate row of swingable bookcases normally nested against said row of stationary cases, an outer row of swingable bookcases normally nested against said intermediate row of cases, said intermediate and outer swingable bookcases being all of width dimensions substantially equal to one-half of the width dimensions of said stationary bookcases, all of said bookcases being of substantially equal depth, said swingable bookcases being individually and selectively swingable to open outwardly and away from the vertical center line of the unit on vertical hinge means into said aisleway, said hinge means being on the outer side corners of each swingable bookcase with respect to the vertical center line of the unit and at the corners thereof facing the aisleway, each of the outer bookcases swinging through an arc of approximately 180° and each of the intermediate bookcases swinging through an arc of approximately 90° with the backs of the intermediate bookcases being adjacent the pivot ends of the outer bookcases when the unit is fully open whereby full access to the inner bookcase is obtained from a central point within the unit.

2. A library storage structure comprising parallel storage units relatively spaced to define an aisleway therebetween, each of said units comprising in combination an inner row of stationary bookcases, intermediate rows of swingable bookcases normally nested against said row of stationary cases, and against each other, and an outer row of swingable bookcases normally nested against said intermediate rows of cases, said intermediate and outer swingable bookcases being all of such width dimensions that two of said swingable bookcases complement one of said stationary bookcases, all of said bookcases being of substantially equal depth, said swingable bookcases being individually and selectively swingable to open outwardly and away from the vertical center line of the unit on vertical hinge means into said aisleway, said hinge means being on the outer side corners of each swingable bookcase with respect to the vertical center line of the unit and at the corners thereof facing the aisleway, each of the outer bookcases swinging through an arc of approximately 180° and each of the intermediate bookcases swinging through an arc of approximately 90° with the backs of the intermediate bookcases being adjacent the pivot ends of the outer bookcases when the unit is fully open whereby full access to the inner bookcase is obtained from a central point within the unit.

3. A library storage structure comprising parallel storage units relatively spaced to define an aisleway therebetween, said units comprising series of cells including in combination an inner double width stationary bookcase, a pair of intermediate single width swingable bookcases normally nested against said stationary case, and a pair of outer single width swingable bookcases normally nested against said intermediate cases, all of said bookcases being of substantially equal depth, said swingable bookcases being individually and selectively swingable to open outwardly and away from the vertical center line of the cell on vertical hinge means into said aisleway, said hinge means being on the outer side corners of each swingable bookcase with respect to the vertical center line of the cell and at the corners thereof facing the aisleway, each of the outer bookcases swinging through an arc of approximately 180° and each of the intermediate bookcases swinging through an arc of approximately 90° with the backs of the intermediate bookcases being adjacent the pivot ends of the outer bookcases when the cell is fully open whereby full access to the inner bookcase is obtained from a central point within the cell.

References Cited in the file of this patent

UNITED STATES PATENTS

| | | |
|---|---|---|
| 500,169 | Tremmel | June 27, 1893 |
| 792,092 | Turner | June 13, 1905 |
| 951,475 | Gerberich | Mar. 8, 1910 |
| 985,222 | Stuck | Feb. 28, 1911 |
| 1,053,996 | Isbell | Feb. 25, 1913 |
| 1,540,242 | Bell | June 2, 1925 |
| 1,988,085 | Orlando | Jan. 15, 1935 |
| 2,142,907 | Mains | Jan. 3, 1939 |
| 2,645,356 | MacDonald | July 14, 1953 |

FOREIGN PATENTS

| | | |
|---|---|---|
| 6,432 | Great Britain | Mar. 24, 1899 |
| 332,963 | France | Sept. 8, 1903 |
| 558,732 | Great Britain | Jan. 18, 1944 |